(12) United States Patent
LaFargue et al.

(10) Patent No.: US 10,239,467 B2
(45) Date of Patent: Mar. 26, 2019

(54) HOLDER FOR MOBILE COMMUNICATIONS DEVICE

(71) Applicant: MobiValet, Inc., Newport Beach, CA (US)

(72) Inventors: Clay J. LaFargue, Laguna Niguel, CA (US); Danielle M. LaFargue, Laguna Niguel, CA (US)

(73) Assignee: MobiValet Inc., Newport Beach, CA (US)

( * ) Notice: Subject to any disclaimer, the term of this patent is extended or adjusted under 35 U.S.C. 154(b) by 0 days.

(21) Appl. No.: 15/201,223

(22) Filed: Jul. 1, 2016

(65) Prior Publication Data

US 2016/0311378 A1 Oct. 27, 2016

Related U.S. Application Data

(63) Continuation-in-part of application No. 12/784,768, filed on May 21, 2010, now Pat. No. 9,403,490.

(60) Provisional application No. 61/180,340, filed on May 21, 2009.

(51) Int. Cl.
| | |
|---|---|
| *B60R 11/02* | (2006.01) |
| *F16M 13/02* | (2006.01) |
| *H04M 1/04* | (2006.01) |
| *H04B 1/3877* | (2015.01) |
| *B60R 11/00* | (2006.01) |

(52) U.S. Cl.
CPC ....... *B60R 11/0241* (2013.01); *F16M 13/022* (2013.01); *H04B 1/3877* (2013.01); *H04M 1/04* (2013.01); *B60R 2011/0063* (2013.01); *B60R 2011/0075* (2013.01); *Y10T 29/49826* (2015.01)

(58) Field of Classification Search
CPC ......... B60R 11/0241; B60R 2011/0063; B60R 2011/0075; F16M 13/022; H04B 1/3877; H04M 1/04; Y10T 29/49826
See application file for complete search history.

(56) References Cited

U.S. PATENT DOCUMENTS

| | | | | |
|---|---|---|---|---|
| D281,064 | S | * | 10/1985 | Scheid .......................... D13/107 |
| 5,248,264 | A | * | 9/1993 | Long .......................... E05C 1/10 |
| | | | | 439/347 |
| D350,528 | S | * | 9/1994 | Bent ............................ D13/108 |
| D368,582 | S | * | 4/1996 | King ............................. D3/218 |
| 6,263,080 | B1 | * | 7/2001 | Klammer ............ B60R 11/0241 |
| | | | | 379/446 |

(Continued)

*Primary Examiner* — Corey N Skurdal
(74) *Attorney, Agent, or Firm* — John A. Fortkort; Fortkort & Houston PC (57) ABSTRACT

A method is provided for mounting a mobile communications device (404) on a substrate. In accordance with the method, a holder (401) is provided which includes (a) a back wall (407) having attaching means thereon for releasably attaching the holder to a substrate, and (b) a front wall (405) opposing said back wall. The holder is releasably mounted on an interior surface of a vehicle. The front wall has a sloped profile which extends a distance $d_1$ from said bottom wall along said first edge as measured along a first axis perpendicular to said bottom wall and parallel to said front wall, and which extends a distance $d_2$ from said bottom wall along said second edge as measured along a second axis perpendicular to said bottom wall and parallel to said front wall, and wherein $d_1 < d_2$.

20 Claims, 10 Drawing Sheets

(56) References Cited

U.S. PATENT DOCUMENTS

| | | | | |
|---|---|---|---|---|
| D451,915 S | * | 12/2001 | Dalmau | D14/253 |
| 6,763,111 B2 | * | 7/2004 | Liao | H04M 1/15 379/430 |
| 2002/0100782 A1 | * | 8/2002 | Marvin | B60R 11/0241 224/483 |

* cited by examiner

HOLDER FOR MOBILE COMMUNICATIONS DEVICE

CROSS-REFERENCE TO RELATED APPLICATIONS

The present application claims priority to U.S. Ser. No. 12/784,768, entitled "HOLDER FOR MOBILE COMMUNICATIONS DEVICE", which was filed on May 21, 2010, and which is incorporated herein by reference in its entirety; which claims priority to U.S. Provisional Application No. 61/180,340, entitled "HOLDER FOR MOBILE COMMUNICATIONS DEVICE", which was filed on May 21, 2009, and which is incorporated herein by reference in its entirety.

FIELD OF THE DISCLOSURE

The present disclosure relates generally to holders for electronic devices, and more particularly to holders for mobile communications devices which are adapted for use in motorized vehicles.

BACKGROUND OF THE DISCLOSURE

Various devices are known to the art for holding cell phones or other mobile communications devices in operational proximity to the driver of a motorized vehicle. Some examples of such devices are depicted in FIGS. 1-3, where like numbered reference numerals refer to similar components.

Figure 1:
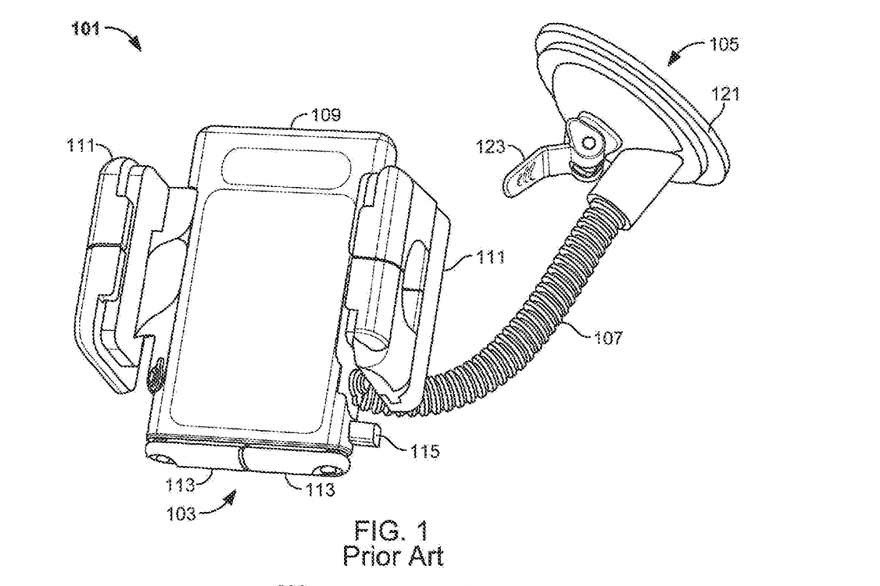
FIG. 1 is a perspective view of a first embodiment of a mobile phone holder currently known to the art.

With reference to FIG. 1, a first prior art device 101 is depicted therein which comprises a holder 103 attached to a base 105 by way of a flexible neck 107. The holder 103 includes a platform 109 equipped with a pair of opposing sidewalls 111. The sidewalls 111 are spaced apart, and the distance between them is adjustable to accommodate the width of a cellular phone (not shown). A pair of rotatable tabs 113 is provided on one end of the platform 109 to hold the cellular phone in place. The tabs 113 may be activated by pressing a button 115 disposed on one side of the platform 109.

The base 105 is equipped with a suction disk 121 which affixes it to a window or dashboard. The base 105 is further equipped with a lever 123 which may be manipulated to apply and release pressure from the suction disk 121. In use, the user attaches the base 105 to a window or dashboard, manipulates the arm until the holder 103 has achieved the proper orientation and disposition with respect to the user, places a cellular phone on the platform 109, and adjusts the sidewalls 111 and wings 113 to hold the cellular phone securely in place.

Figure 2:
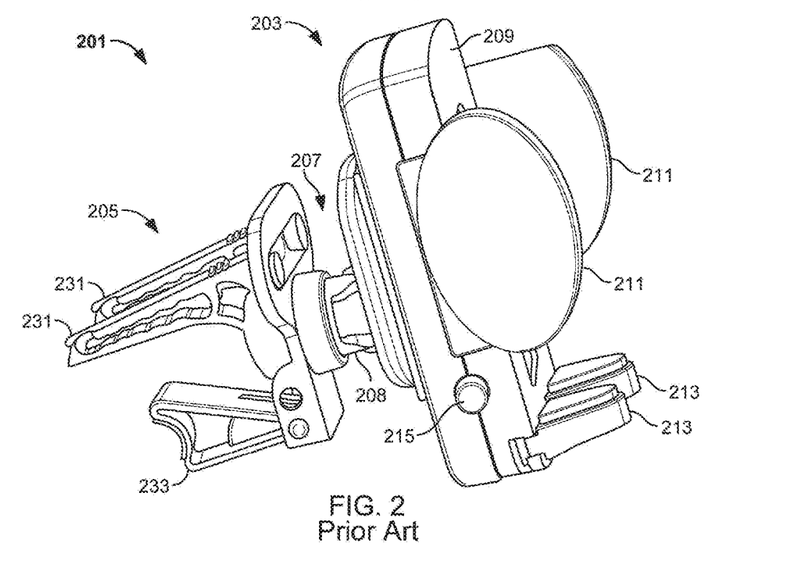
FIG. 2 is a perspective view of a second embodiment of a mobile phone holder currently known to the art.
Figure 3:
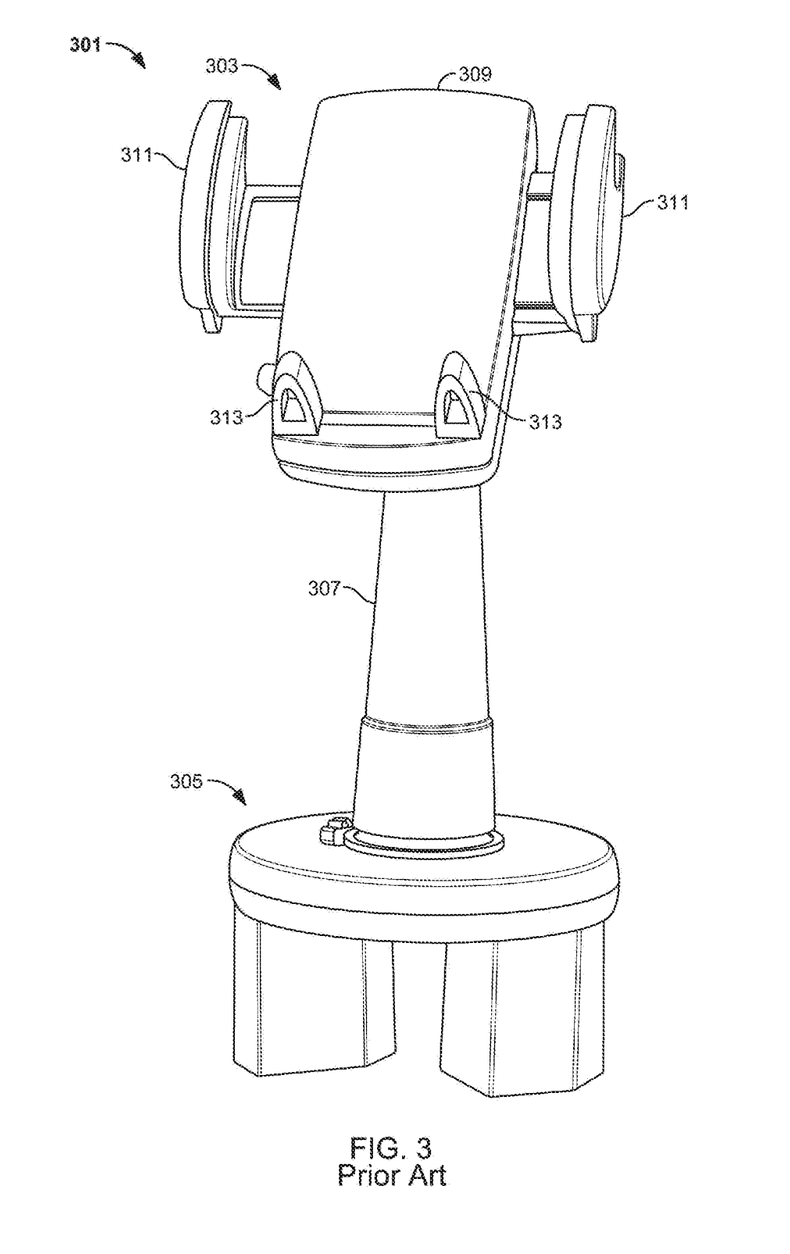
FIG. 3 is a perspective view of a third embodiment of mobile phone holder currently known to the art.

With reference to FIG. 2, a second prior art device 201 is depicted which functions in a manner similar to that of the first prior art device 101. However, while the first prior art device 101 is adapted to be attached to a window or dashboard, the second prior art device 201 is adapted to attach to the louvers of a heating/air conditioning vent (not shown). Hence, the base 205 of this device 201 is equipped with pairs of opposing protrusions 231, 233 which releasably engage a vent louver. The neck 207 in this device 201 is equipped with a movable joint 208 which allows the holder 203 to be adjusted to a suitable orientation for use.

With reference to FIG. 3, a third prior art device 301 is depicted therein which functions in a manner similar to that of the second prior art device 201. However, while the second prior art device 201 is adapted to be attached to the louvers of a heating/air conditioning vent, the third prior art device 301 is adapted to sit in a cup holder (not shown). Thus, the third device 301 is equipped with a rounded base 305 which sits in a standard sized cup holder. The holder 303 of this device 301 is attached to the base 305 by way of a telescopic neck 307 which may be adjusted to position the holder 303 at a suitable operational height.

BRIEF DESCRIPTION OF THE DRAWINGS

In the following figures, like numbered reference numerals refer to similar components.

SUMMARY OF THE DISCLOSURE

In one aspect, a method is provided for mounting a mobile communications device on the interior of a vehicle. In accordance with the method, a holder is provided which includes (a) a back wall having attaching means thereon for releasably attaching the holder to a substrate, and (b) a front wall opposing said back wall, said front wall extending only partially across a surface of said mobile communications device when said mobile communications device is disposed in said holder. The holder is releasably mounted on an interior surface of a vehicle.

In another aspect, a combination of a mobile communications device with a holder for the device is provided. The holder comprises (a) a back wall having attaching means thereon for releasably attaching the holder to a substrate, (b) a front wall opposing said back wall, and (c) first and second opposing side walls, each of which is connected to said back wall and said front wall. The mobile communications device is equipped with a charger having a cord which terminates in a connector, wherein said connector releasably engages a port on a surface of said mobile communications device, and wherein said holder is configured such that said mobile communications device can be removed from said holder without disconnecting said cord.

In a further aspect, a combination of a mobile communications device with a holder for the device is provided. The holder comprises attaching means thereon for releasably attaching the holder to a substrate, wherein said holder is configured such that said mobile communications device can be removed from said holder without disconnecting said cord.

In still another aspect, a method for mounting a mobile communications device on the interior of a vehicle is provided. In accordance with the method, a holder is provided which includes (a) a back wall having attaching means thereon for releasably attaching the holder to a substrate, (b) a front wall opposing said back wall, and (c) first and second opposing side walls, each of which is connected to said back wall and said front wall, wherein said mobile communications device is equipped with a charger having a cord which terminates in a connector, wherein said connector releasably engages a port on a surface of said mobile communications device, and wherein said holder is configured such that said mobile communications device can be removed from said holder without disconnecting said cord. The holder is releasably mounted on an interior surface of a vehicle.

In yet another aspect, a method for mounting a mobile communications device on the interior of a vehicle is provided. In accordance with the method, a holder is provided which includes attaching means thereon for releasably attaching the holder to a substrate, wherein said holder is configured such that said mobile communications device can be removed from said holder without disconnecting said cord. The holder is releasably mounted on an interior surface of a vehicle.

In another aspect, a combination of a mobile communications device with a holder for the device is provided. The holder comprises (a) a back wall having attaching means thereon for releasably attaching the holder to a substrate, and (b) a front wall opposing said back wall, said front wall extending only partially across a surface of said mobile communications device when said mobile communications device is disposed in said holder.

In a further aspect, a mobile communications device is provided in combination with a holder for the mobile communications device. The holder comprises (a) a back wall having attaching means thereon for releasably attaching the holder to a substrate; (b) a front wall opposing said back wall and having first and second opposing edges; and (c) a bottom wall which connects said front wall to said back wall; wherein said front wall has a first edge which extends a distance $d_1$ from said bottom wall, wherein said front wall has a second edge which extends a distance $d_2$ from said bottom wall along said second edge, and wherein $d_1<d_2$.

In still another aspect, a method is provided for mounting a mobile communications device to a substrate. The method comprises (a) providing a holder which includes (i) a back wall having attaching means thereon for releasably attaching the holder to a substrate, (ii) first and second opposing sidewalls, (iii) a bottom wall, and (iv) a front wall extending from said first sidewall to said second sidewall, wherein said front wall only partially covers said mobile communications device when said mobile communications device is disposed in said holder; (b) releasably mounting the holder on a rigid interior surface of a vehicle; and (c) placing a mobile communications device in the holder; wherein said front wall has a sloped profile which extends a distance $d_1$ from said bottom wall along said first edge as measured along a first axis perpendicular to said bottom wall and parallel to said front wall, and which extends a distance $d_2$ from said bottom wall along said second edge as measured along a second axis perpendicular to said bottom wall and parallel to said front wall, and wherein $d_1<d_2$.

In yet another aspect, a method is provided for mounting a mobile communications device to a substrate. The method comprises (a) providing a holder which includes (i) a back wall having attaching means thereon for releasably attaching the holder to a substrate, (ii) a bottom wall, (iii) a front wall which is connected to said back wall by said bottom wall and which has opposing first and second edges, (iv) first and second opposing sidewalls, each of which extends from said back wall to said front wall, wherein said front wall extends from said first sidewall to said second sidewall and only partially covers said mobile communications device when said mobile communications device is disposed in said holder, and wherein said back wall has a major axis and a minor axis which is perpendicular to said major axis; (c) releasably mounting the holder on a rigid interior surface of a vehicle such that the major axis is in a horizontal orientation; and (d) placing a mobile communications device in the holder, wherein said mobile communications device has a power port which releasably attaches to a power cord, and wherein said mobile communications device rests in said holder in a horizontal orientation and such that said first side wall extends below said power port; wherein said front wall has a first edge which extends a distance $d_1$ from said bottom wall, wherein said front wall has a second edge which extends a distance $d_2$ from said bottom wall, and wherein $d_1<d_2$.

DETAILED DESCRIPTION

While the prior art devices 101, 201 and 301 of FIGS. 1-3 may be suitable for their intended purposes, each of these devices has certain drawbacks attendant to their usage. In particular, each of these devices interferes with one or more other features of the interior of an automobile. For example, the first device 101 is adapted to be mounted on a dashboard or window, and hence interferes with the driver's visibility and is a source of distraction. The second device 201 is adapted to be mounted on the louvers of a heating/air conditioning vent, and hence interferes with the proper functioning of the vent by obstructing the air flow. The third device 301 is adapted to be mounted in a cup holder, and hence precludes the intended use of the cup holder (i.e., to hold a beverage).

It has now been found that the foregoing problems may be addressed through the use of mobile communications device holders of the type disclosed herein. A first particular, non-limiting embodiment of such a holder is disclosed in FIGS. 4-9.

With reference thereto, the holder 401 depicted therein is adapted to hold a mobile communications device 404 and comprises a front wall 405, a back wall 407, first 409 and second 411 opposing side walls, and a bottom wall 413. In the particular embodiment depicted, the walls are made out of leather (real or synthetic), although one skilled in the art will appreciate that various other materials, and combinations of materials, may be utilized in the construction of the holder 401. Such other materials include, but are not limited to, nylon, plastics, velvet, various fabrics, various animal skins (synthetic or natural), and the like.

Figure 4:
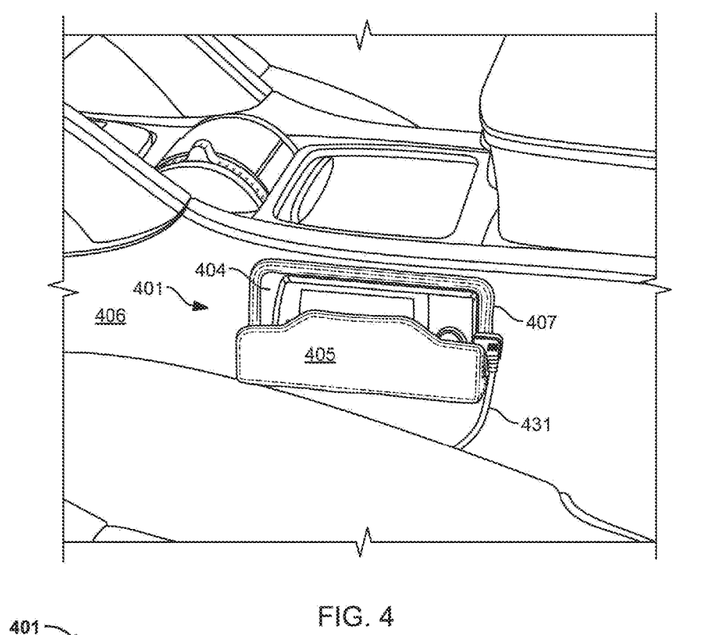
FIG. 4 is a perspective view of a first embodiment of a holder for a mobile communications device in accordance with the teachings herein; the holder is shown mounted on the center console of an automobile, and is shown with a cellular phone inserted therein.
Figure 5:
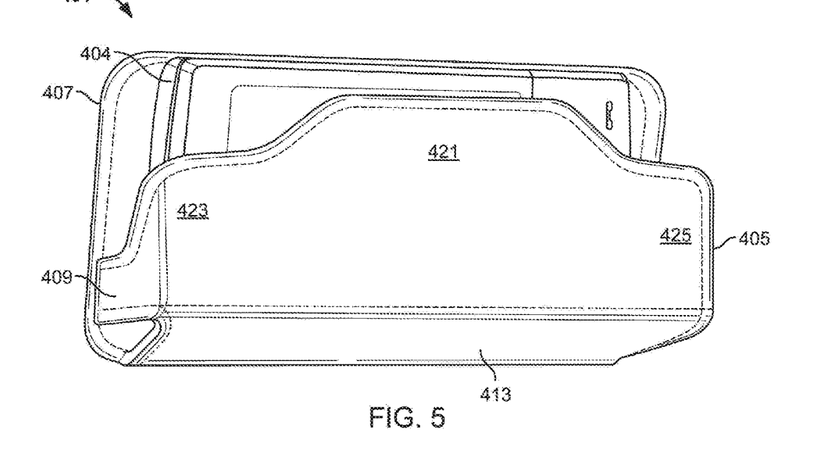
FIG. 5 is a perspective view of the holder of FIG. 4, shown with a cellular phone inserted therein.

The holder 401 in this particular embodiment is adapted to be releasably attached to an interior surface of a vehicle, such as the surface of a central console 406 (see FIG. 4). Typically, the holder 401 will be mounted in the vicinity of the driver so that the mobile communications device 404 stored therein will be readily accessible to the driver.

Figure 9:
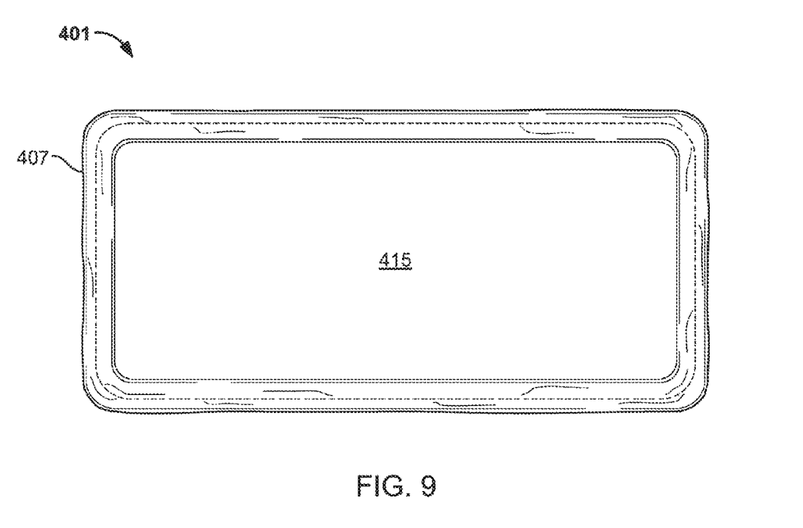
FIG. 9 is a side view showing the attaching surface of the holder of FIG. 4.

Various means may be utilized in accordance with the teachings herein to releasably attach the holder 401 to an interior surface of a vehicle. In the presently depicted embodiment, this is accomplished through the use of a hook-and-loop type fastener system. In particular, as seen in FIG. 9, the back wall 407 of the holder 401 is equipped with a plurality of embedded hooks 415 which releasably engage a plurality of loops (not shown) disposed on the substrate, thus creating a flush fit between the holder 401 and the substrate it is mounted on. The loops may be applied, for example, as a looped fabric with an adhesive backing. However, in other possible embodiments, various types of magnets, adhesives and fasteners may be used in place of the hook-and-loop type fastener to secure the holder 401 to a substrate.

Figure 7:
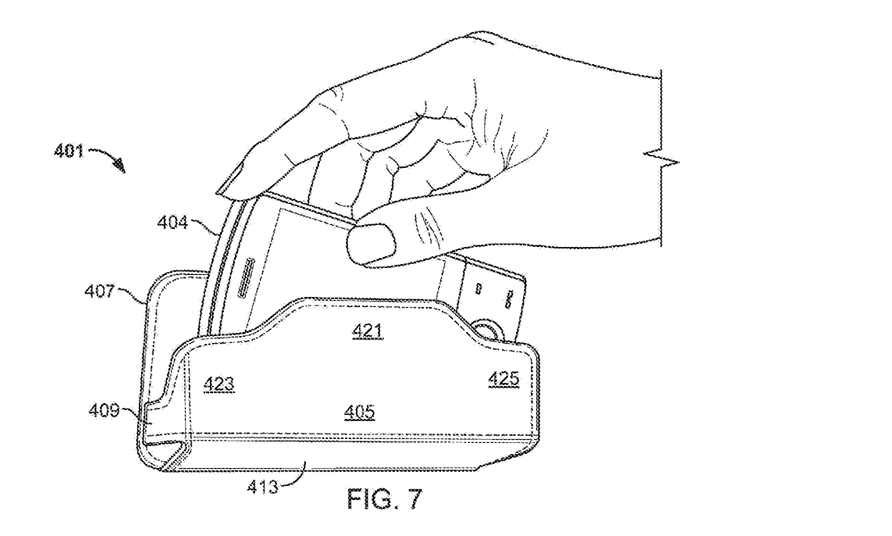
FIG. 7 is a perspective view of the holder of FIG. 4 showing a cellular phone being removed from the holder.
Figure 8:
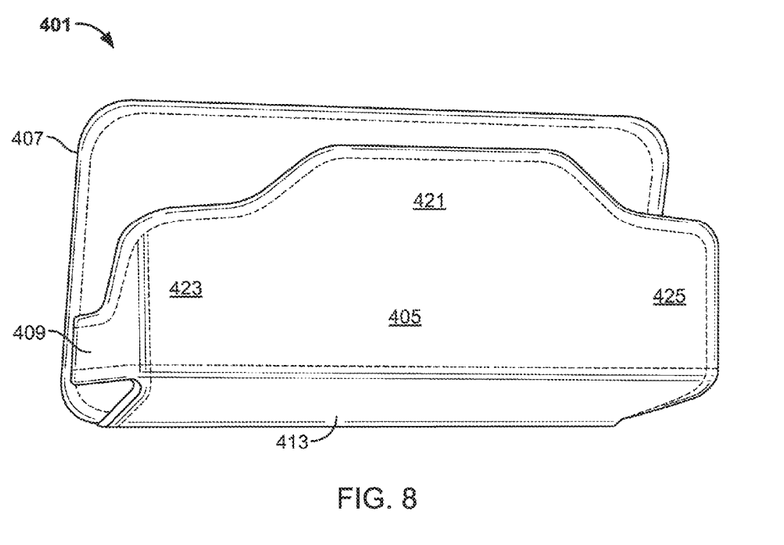
FIG. 8 is a perspective view of the holder of FIG. 4.

As best seen in FIGS. 4, 5, 7 and 8, the front wall 405 of the holder 401 is contoured to facilitate removal of a mobile communications device 404 therefrom, while still holding it securely therein. In particular, the front wall 405 has a central portion 421 which extends a distance $d_1$ from the bottom wall 413 as measured along an axis perpendicular to said bottom wall 413 and parallel to the front wall 405, and has first 423 and second 425 lateral portions which extend a distance $d_2$ from the bottom wall 413 as measured along an axis perpendicular to said bottom wall and parallel to said front wall, and wherein $d_1 > d_2$. As best seen in FIG. 7, this configuration allows the mobile communications device 404 to be readily removed from the holder 401 by grasping one corner of the device 404. This configuration also allows the user to partially view the display of the mobile communications device 404 while it is disposed within the holder which, in many cases, will allow the user to determine, for example, the identity of a caller without removing the mobile communications device 404 from the holder 401. In some embodiments, transparent materials, different profiles of the front wall 405, or other suitable means may be utilized to increase the portion of the display which is visible to the user while the mobile communications device 404 is disposed within the holder 401.

Figure 6:
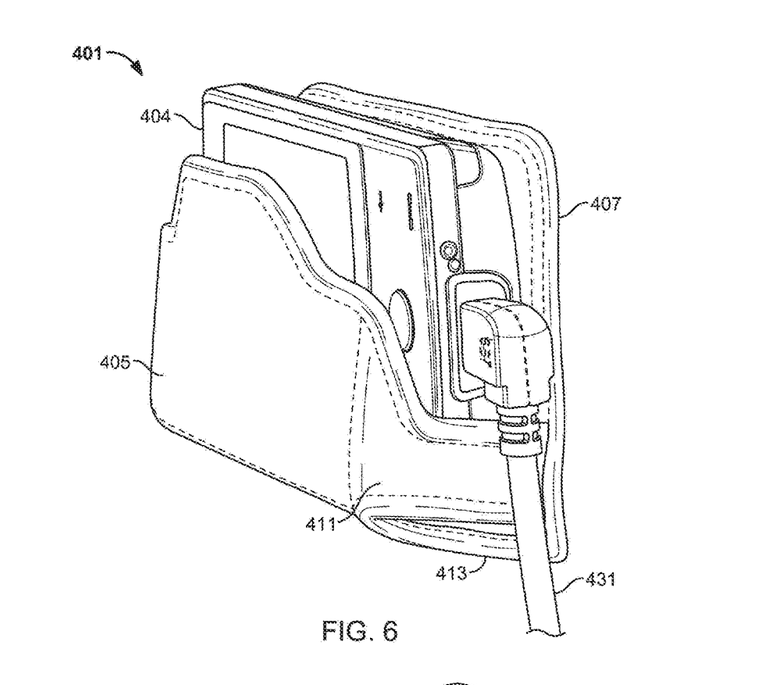
FIG. 6 is a perspective view of the holder of FIG. 4 shown with a cellular phone inserted therein.

As best seen in FIG. 4, the dimensions of the back wall 407 of the holder 401 are chosen to be slightly larger than those of the mobile communications device 404. This ensures that the mobile communications device 404 is adequately protected from the surrounding surfaces while it is in the holder 401. Moreover, as best seen in FIG. 6, the back wall 407 and the central portion 421 of the front wall 405 are sufficiently tall, and are spaced apart appropriately, such that the mobile communications device 404 is maintained in an upright position. In addition, the bottom wall 413 is angled slightly so that the mobile communications device 404 naturally rests in an upright position against the back wall 407 of the holder 401.

Preferably, the back wall 407 of the holder 401 is sufficiently flexible to conform, or essentially conform, to the shape of a substrate to which the holder 401 is attached. For example, in a preferred embodiment, the walls of the holder 401 have a sandwiched construction in which the outer layers are leather, vinyl, or some other fabric or material chosen for the exterior surfaces of the holder 401, and in which one or more of the inner layers comprises plastic, cardboard or some other material chosen to impart a sufficient degree of rigidity to the walls of the holder 401. Preferably, however, such rigid materials are omitted from the construction of the back wall 407. Consequently, the back wall 407 conforms readily to the surfaces of a console or other such substrate to which it is mounted, and the holder 401 sits flush on the substrate. The degree of flushness of the mount may be further improved through the use of embedded and/or recessed fasteners (such as an embedded or recessed field of hooks or loops). In many installations, the flushness of the resulting mount will advantageously cause the holder 401 to appear customized for the surface to which it is mounted. Moreover, since the substrate will typically impart sufficient rigidity to the back wall 407 of the holder 401, this approach reduces the materials, cost of manufacture, and weight of the holder 401.

As best seen in FIGS. 5-8, the first 409 and second 411 opposing side walls of the holder 401 are contoured downward. This allows the edges of the mobile communications device 404 to be easily grasped for removal from the holder 401, while also allowing the communications device 404 to be removed from the holder 401 without unplugging it from the power cord 431 (see FIGS. 4 and 6). In addition, this feature provides unobstructed access to the recharging port of the mobile communications device 404 with the power cord 431 (see FIGS. 4 and 6) while the mobile communications device 404 is seated firmly within the holder 401. In particular, the contour of the first 409 and second 411 opposing side walls of the holder 401 are such that, when the mobile communications device 404 is attached to the power cord, the mobile communications device 404 will not be seated in a "crooked" fashion within the holder, since the first 409 and second 411 opposing side walls of the holder 401 will be below the recharging port of the mobile communications device 404.

Figure 10:
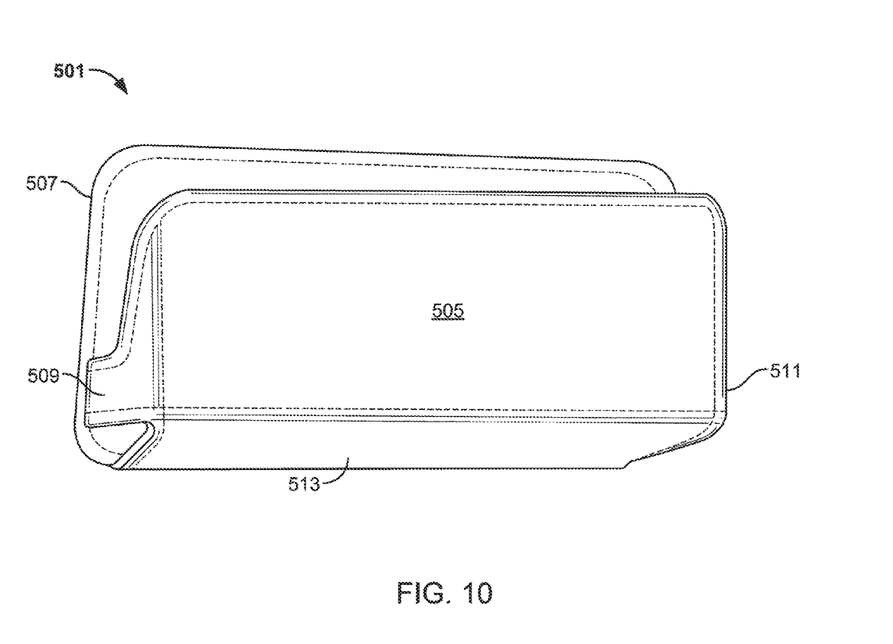
FIG. 10 is a perspective view of a second embodiment of a holder for a mobile communications device in accordance with the teachings herein.

FIG. 10 depicts a second particular, non-limiting embodiment of a holder in accordance with the teachings herein. The holder 501 shown therein is similar in many respects to the holder 401 depicted in FIG. 8. The holder 501 is adapted to hold a mobile communications device (not shown) and comprises a front wall 505, a back wall 507, first 509 and second 511 opposing side walls (the first 509 and second 511 opposing side walls are preferably mirror images of each other), and a bottom wall 513. In contrast to the holder 401 of FIG. 8, the holder 501 of FIG. 10 has a front wall 505 of uniform height. In some variations of this embodiment, the front wall 505 (or a portion thereof) may comprise a transparent material so that the display of the mobile communications device may be viewed while it is disposed in the holder.

Figure 11:
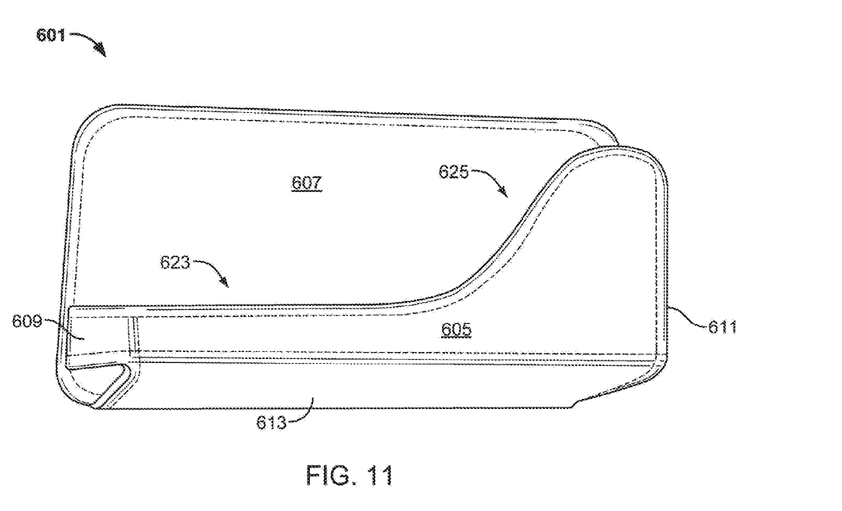
FIG. 11 is a perspective view of a third embodiment of a holder for a mobile communications device in accordance with the teachings herein.

FIG. 11 depicts a third particular, non-limiting embodiment of a holder in accordance with the teachings herein. The holder 601 shown therein is similar in many respects to the holder 401 depicted in FIG. 8. The holder 601 is adapted to hold a mobile communications device (not shown) and comprises a front wall 605, a back wall 607, first 609 and second 611 opposing side walls, and a bottom wall 613. In contrast to the holder 401 of FIG. 8, the holder 601 of FIG. 11 has a front wall 605 with a sloped profile featuring a first low lying, flat portion 623 and a second raised portion 625. The first portion 623 is preferably high enough to facilitate retaining the mobile communications device in the holder, but low enough so as to not obstruct the display of the device. The second portion 625 is taller than the first portion 623 and provides additional surface area to maintain the mobile communications device in the holder. Several variations of this embodiment are possible in which the width of the second portion 625 varies. However, it is preferred that the width of the second portion 625 is small enough so that the second portion 625 does not obstruct the display of the mobile communications device.

Figure 12:
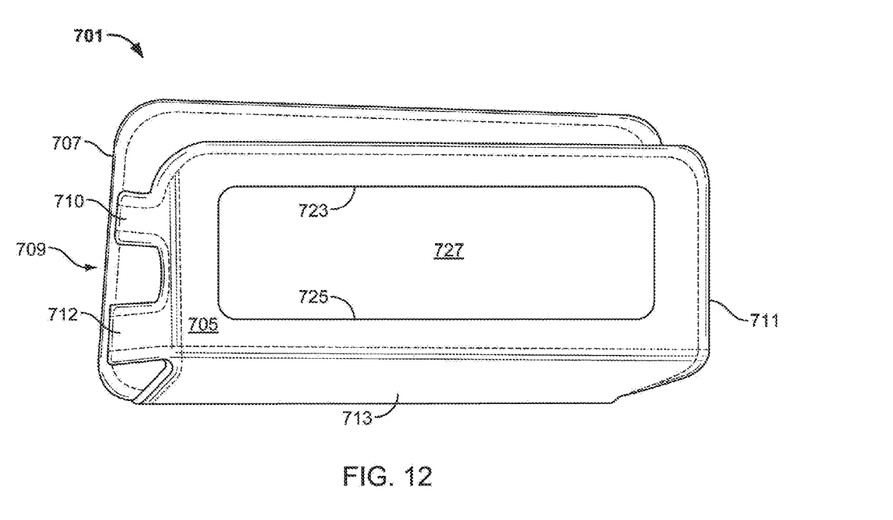
FIG. 12 is a perspective view of a fourth embodiment of a holder for a mobile communications device in accordance with the teachings herein.

FIG. 12 depicts a fourth particular, non-limiting embodiment of a holder in accordance with the teachings herein. The holder 701 shown therein is similar in many respects to the holder 401 depicted in FIG. 8. The holder 701 is adapted to hold a mobile communications device (not shown) and comprises a front wall 705, a back wall 707, first 709 and second 711 opposing side walls (the details of the second sidewall 711 are not clearly shown, but the second sidewall 711 is essentially a mirror image of the first side wall 709), and a bottom wall 713. In contrast to the holder 401 of FIG. 8, the holder 701 of FIG. 11 has a central window 727 bounded by upper 723 and lower 725 portions of the front wall 705. The central window 727 may be an opening, or a transparent portion of material. This embodiment is advantageous in that it holds the mobile communications device (not shown) securely in place, while still allowing its display to be viewed. It is also to be noted that, in this embodiment, the sidewalls 709, 711 have discrete upper 710 and lower 712 portions.

Figure 13:
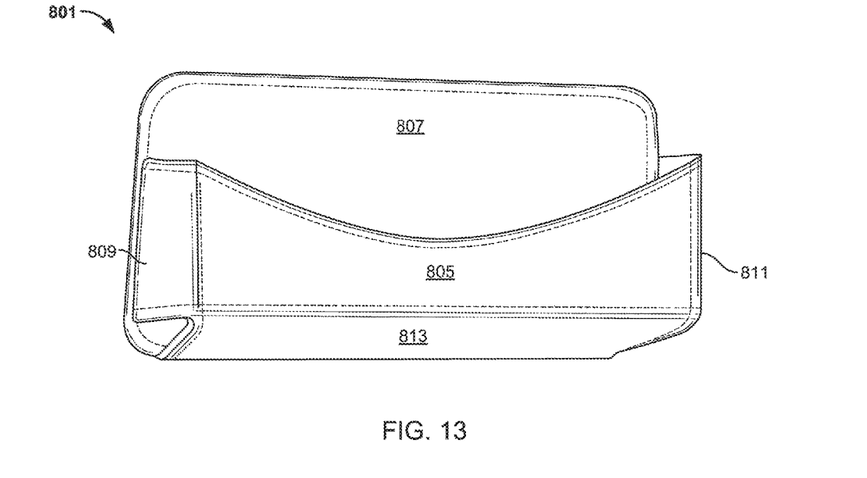
FIG. 13 is a perspective view of a fifth embodiment of a holder for a mobile communications device in accordance with the teachings herein.

FIG. 13 depicts a fifth particular, non-limiting embodiment of a holder in accordance with the teachings herein. The holder 801 shown therein is similar in many respects to the holder 401 depicted in FIG. 8. The holder 801 is adapted to hold a mobile communications device (not shown) and comprises a front wall 805, a back wall 807, first 809 and second 811 opposing side walls (the details of the second sidewall 811 are not shown, but it is essentially a mirror image of the first side wall 809), and a bottom wall 813. In contrast to the holder 401 of FIG. 8, the front wall 805 in the holder 801 of FIG. 13 has a profile whose upper surface is defined by a single curve which is concave upward.

Figure 14:
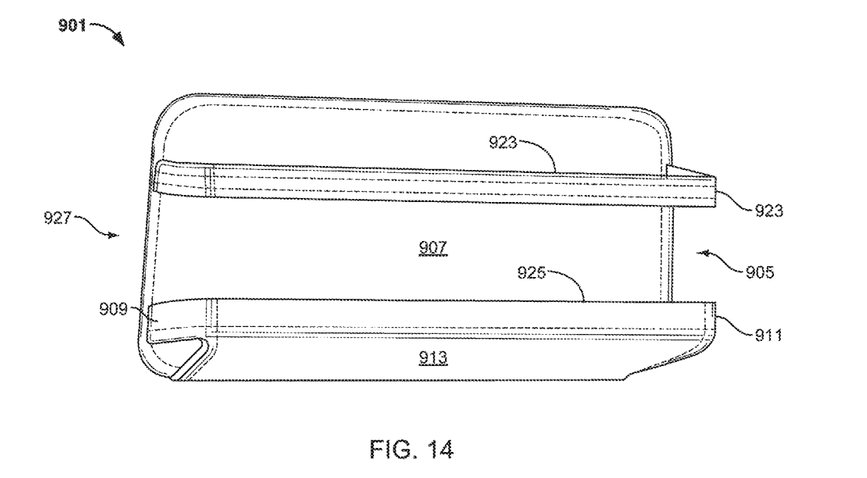
FIG. 14 is a perspective view of a sixth embodiment of a holder for a mobile communications device in accordance with the teachings herein.

FIG. 14 depicts a sixth particular, non-limiting embodiment of a holder in accordance with the teachings herein. The holder 901 shown therein is similar in many respects to the holder 401 depicted in FIG. 8. The holder 901 is adapted to hold a mobile communications device (not shown) and comprises a front wall 905 comprising upper 923 and lower 925 portions which define a central opening 927, a back wall 907, first 909 and second 911 opposing side walls (the details of the second sidewall 911 are not shown, but it is essentially a mirror image of the first side wall 909), and a bottom wall 913. The upper 923 and lower 925 portions of the front wall 905 may be of various dimensions and shapes. Moreover, while the upper wall 923 is depicted as being generally rectangular, variations of the upper wall are possible in which its profile is polygonal or irregular.

Figure 15:
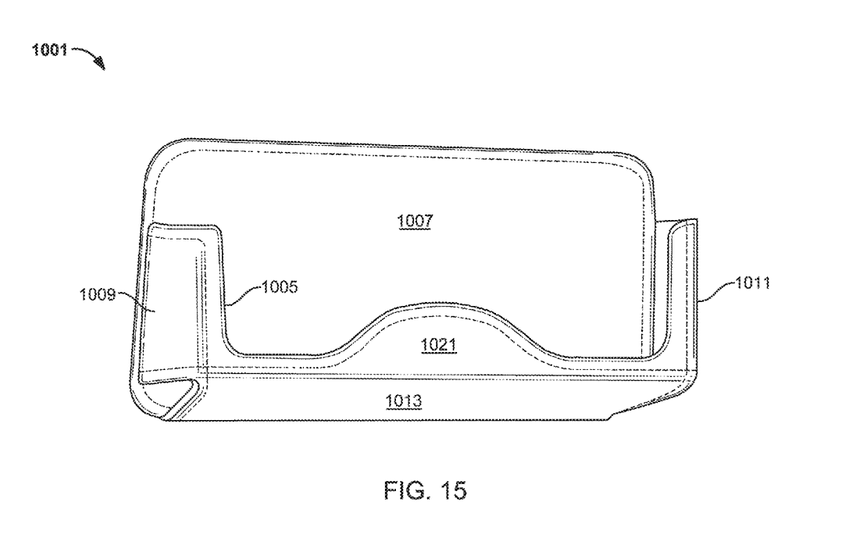
FIG. 15 is a perspective view of a seventh embodiment of a holder for a mobile communications device in accordance with the teachings herein.

FIG. 15 depicts a seventh particular, non-limiting embodiment of a holder in accordance with the teachings herein. The holder 1001 shown therein is similar in many respects to the holder 401 depicted in FIG. 8. The holder 1001 is adapted to hold a mobile communications device (not shown) and comprises a front wall 1005 having a central rounded protrusion 1021, a back wall 1007, first 1009 and second 1011 opposing side walls (the details of the second sidewall 1011 are not shown, but it is essentially a mirror image of the first side wall 1009), and a bottom wall 1013.

Figure 16:
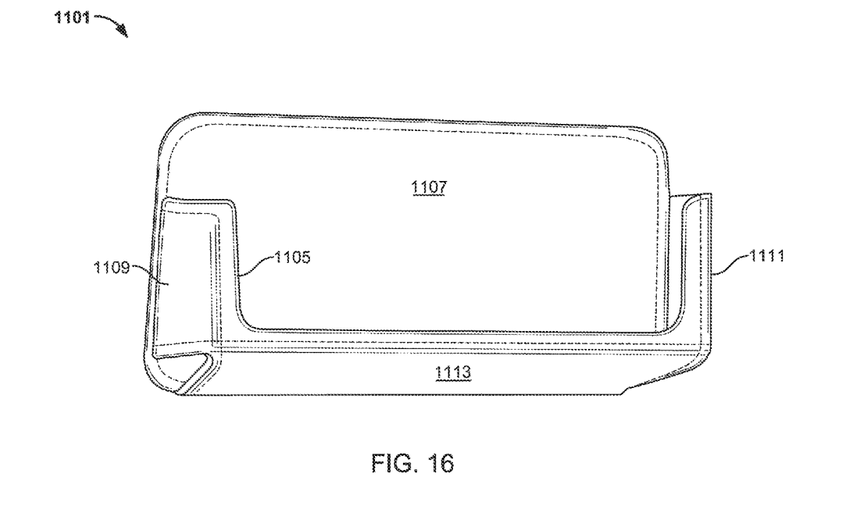
FIG. 16 is a perspective view of an eighth embodiment of a holder for a mobile communications device in accordance with the teachings herein.

FIG. 16 depicts an eighth particular, non-limiting embodiment of a holder in accordance with the teachings herein. The holder 1101 shown therein is similar in many respects to the holder 1001 depicted in FIG. 15, but is devoid of the rounded protrusion 1021. The holder 1101 is adapted to hold a mobile communications device (not shown) and comprises a front wall 1105, a back wall 1107, first 1109 and second 1111 opposing side walls, and a bottom wall 1113.

Figure 17:
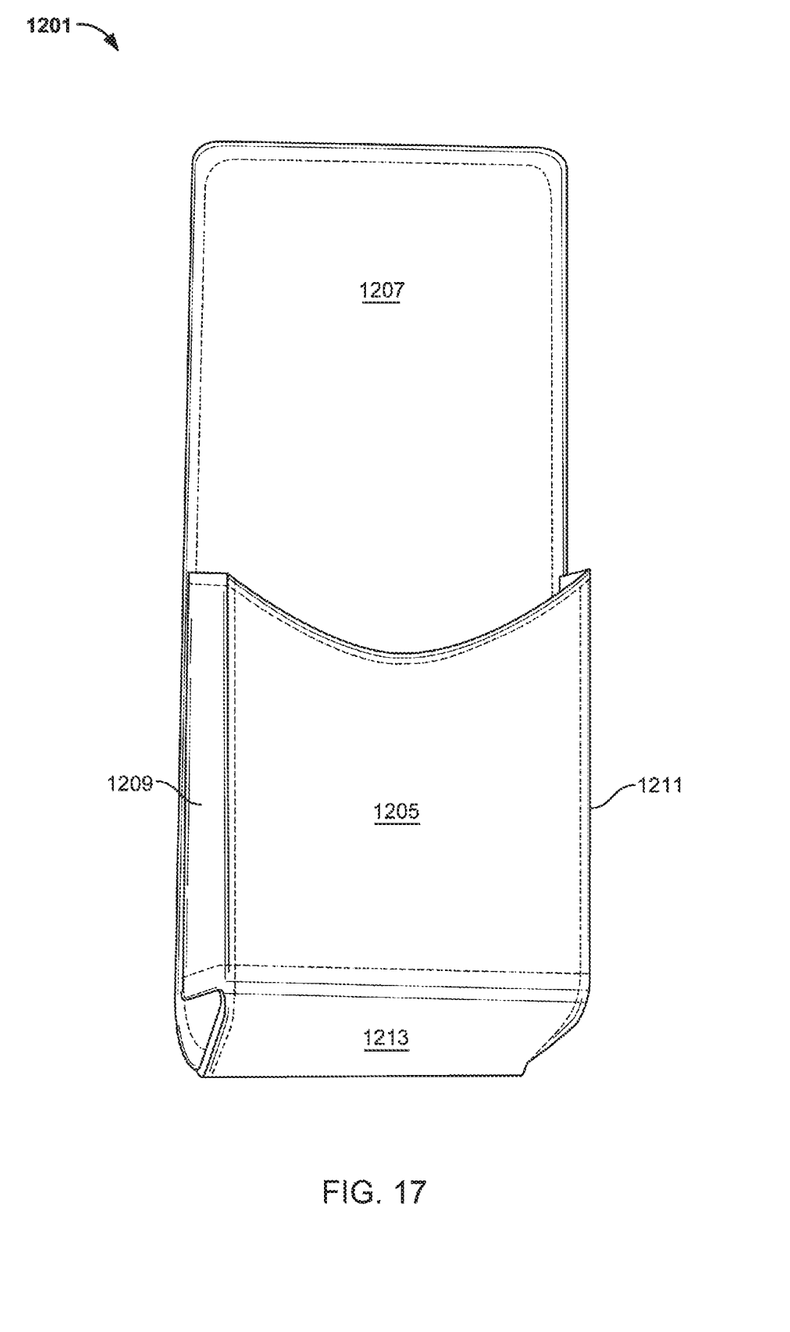
FIG. 17 is a perspective view of a ninth embodiment of a holder for a mobile communications device in accordance with the teachings herein.

FIG. 17 depicts a ninth particular, non-limiting embodiment of a holder in accordance with the teachings herein. The holder 1201 shown therein is similar in many respects to the holder 1001 depicted in FIG. 13, but is adapted to hold a mobile communications device (not shown) in a vertical orientation. The holder 1201 and comprises a front wall 1205, a back wall 1207, first 1209 and second 1211 opposing side walls, and a bottom wall 1213.

The holders described herein may comprise various materials. Preferably, the walls are made out of leather (real or synthetic), although one skilled in the art will appreciate that various other materials, and combinations of materials, may be utilized in the construction of the holder. Such other materials include, but are not limited to, nylon, plastics, velvet, various fabrics, various animal skins (synthetic or natural), and the like.

Moreover, while several of the embodiments disclosed herein are illustrated with stitching, it will be appreciated that the components of the holders may be joined together using any of the various means known to the art which are suitable for accomplishing such an end. For example, the holders may be assembled using various adhesives, heat treatments, or fasteners to adjoin their components together. The holders may also be molded as three-dimensional articles.

In some embodiments, the holders disclosed herein may be equipped with a wireless or inductive charging system which may be utilized to charge or recharge the power source of a mobile communications device disposed within the holder. Systems and methodologies for the wireless or inductive charging of mobile communications devices are known to the art and are described, for example, in U.S. 2007/0279002 (Partovi), entitled "Power Source, Charging System, And Inductive Receiver For Mobile Devices"; in U.S. 2009/0075704 (Wang), entitled "Mobile Communication Device With Charging Module"; and in U.S. 2013/0244735 (Bury), entitled "Holder For A Mobile Telephone", all of which are incorporated herein by reference in their entirety. It will be appreciated that the addition to, or incorporation of, such wireless or inductive charging capabilities to the holders described herein may provide a convenient means for users to preserve or top off battery charges while using the device.

In some embodiments, the wireless or inductive charging device may be powered by a cigarette lighter, USB outlet or other suitable power source located inside of the vehicle. Thus, for example, the wireless or inductive charging device may be hardwired to a suitable plug or adapter which inserts into the cigarette lighter of a vehicle (or, in more modern vehicles, which plugs into an available USB outlet). The wireless or inductive charging device may then charge a mobile communications device while it is placed in the holder, without requiring any physical connection to the mobile communications device. The wireless or inductive charging device will preferably include a charging coil, which may be incorporated into or attached to the back wall of the holder, or which may be incorporated into or attached to a mount which attaches the back wall of the holder to a substrate.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. In combination with a mobile communications device, a holder for the device, the holder comprising:
   a back wall having attaching means thereon for releasably attaching the holder to a substrate;
   a front wall opposing said back wall and having first and second opposing edges;
   a first side wall which is attached along a seam on a first end thereof to said front wall, and which is attached on a second end thereof to said back wall; and
   a bottom wall which connects said front wall to said back wall;
   wherein said front wall has a first edge which extends a distance $d_1$ from said bottom wall, wherein said front wall has a second edge which extends a distance $d_2$ from said bottom wall along said second edge, wherein said front wall extends a distance $d_c$ from said bottom wall as measured along a central axis which is perpendicular to said bottom wall and parallel to said front wall and which intersects the midpoint of said seam, and wherein $d_1 \leq d_c < d_2$, wherein $d_1 > 0$, and wherein $2d_1 < d_2$.

2. The combination of claim 1, wherein said front wall has a top edge, wherein said top edge has a convex portion which includes said second edge, and wherein said top edge has a concave portion adjacent to said convex portion.

3. The combination of claim 2, wherein said front wall has a bottom edge, wherein said bottom edge of said front wall abuts said bottom wall along a seam, wherein said holder further comprises first and second opposing side walls, each of which is connected to said back wall and said front wall, and wherein said front wall is connected to said back wall by a bottom wall.

4. The combination of claim 1, wherein said substrate is a surface on the interior of a vehicle.

5. The combination of claim 1, wherein said substrate is a central console in the interior of a vehicle.

6. The combination of claim 1, wherein said mobile communications device has a front surface which includes a display screen, and wherein said display screen is at least partially visible when said mobile communications device is disposed in said holder.

7. The combination of claim 1, wherein said mobile communications device has a receptacle which releasably engages a plug used to connect said mobile communications device to a power source by way of a power cord, wherein said holder has a side wall which extends between said front wall and said back wall, and wherein said side wall extends beneath said plug when said plug is engaged in said receptacle.

8. The combination of claim 1, wherein said front wall adjoins said bottom wall along a seam, wherein said front wall extends a distance $d_c$ from said bottom wall as measured along a central axis which is perpendicular to said bottom wall and parallel to said front wall and which intersects the midpoint of said seam, and wherein $d_1 < d_c < d_2$.

9. The combination of claim 1, wherein said front wall is planar and asymmetric, and wherein said back wall is essentially rectangular.

10. The method of claim 1, wherein said first sidewall has a maximum height $h_1$, and wherein $d_1 \geq h_1$.

11. A method for mounting a mobile communications device to a substrate, comprising:
    providing a holder which includes (a) a back wall having attaching means thereon for releasably attaching the holder to a substrate, (b) first and second opposing sidewalls, (c) a bottom wall, and (d) a front wall extending from said first sidewall to said second sidewall, wherein said front wall only partially covers said mobile communications device when said mobile communications device is disposed in said holder, and (e) a first side wall which is attached along a seam on a first end thereof to said front wall, and which is attached on a second end thereof to said back wall;
    releasably mounting the holder on a rigid interior surface of a vehicle; and
    placing a mobile communications device in the holder;
    wherein said front wall has a sloped profile which extends a distance $d_1$ from said bottom wall along a first edge as measured along a first axis perpendicular to said bottom wall and parallel to said front wall, and which extends a distance $d_2$ from said bottom wall along a second edge as measured along a second axis perpendicular to said bottom wall and parallel to said front wall, wherein said front wall extends a distance $d_c$ from said bottom wall as measured along a central axis which is perpendicular to said bottom wall and parallel to said front wall and which intersects the midpoint of said seam, and wherein $d_1 \leq d_c < d_2$, wherein $d_1 > 0$, and wherein $2d_1 < d_2$.

12. The method of claim 11, wherein said back wall has a major axis and a minor axis which is perpendicular to said major axis, and wherein the holder is mounted on the interior surface such that the major axis is in a horizontal orientation.

13. The method of claim 11, wherein said bottom wall is connected to said front wall and said back wall, wherein said mobile communications device rests on said bottom wall when said mobile communications device is placed in said holder, wherein said mobile communications device has a power port which releasably attaches to a power cord, and wherein said mobile communications device rests in said holder such that said first side wall extends below said power port.

14. The method of claim 11, wherein said bottom wall is connected to said front wall and said back wall, wherein said bottom wall is spaced apart from said first and second side walls, wherein said front wall is connected to said first and second sidewalls across first and second seams, and wherein said front wall is connected to said bottom wall across a third seam.

15. The method of claim 11, wherein said mobile communications device has a front surface with a display thereon and a back surface which opposes said front surface, and wherein the surface area of the back wall is greater than the surface area of the back surface of said mobile communications device.

16. The method of claim 11, wherein said front wall is essentially P-shaped, wherein said second side wall is essentially L-shaped, and wherein said first side wall is not essentially L-shaped.

17. The method of claim 11, wherein releasably mounting the holder to the interior surface of a vehicle includes:
    adhering a first material to the interior surface; and adhering a second material to an exterior surface of said holder, wherein said first material releasably mates with said second material.

18. The method of claim 11, wherein each of said first and second opposing side walls is connected to said back wall and said front wall, wherein said mobile communications device is equipped with a charger having a cord which terminates in a connector, wherein said connector releasably engages a port on a surface of said mobile communications device, wherein said holder is configured such that said mobile communications device can be removed from said holder without disconnecting said cord, and wherein said back wall has a major axis and a minor axis which is perpendicular to said major axis.

19. A method for mounting a mobile communications device to a substrate, comprising:

providing a holder which includes (a) a back wall having attaching means thereon for releasably attaching the holder to a substrate, (b) a bottom wall, (c) a front wall which is connected to said back wall by said bottom wall and which has opposing first and second edges, (d) first and second opposing sidewalls, each of which extends from said back wall to said front wall and adjoins said front wall along a seam, wherein said front wall extends from said first sidewall to said second sidewall and only partially covers said mobile communications device when said mobile communications device is disposed in said holder, and wherein said back wall has a major axis and a minor axis which is perpendicular to said major axis;

releasably mounting the holder on a rigid interior surface of a vehicle such that the major axis is in a horizontal orientation; and placing a mobile communications device in the holder, wherein said mobile communications device has a power port which releasably attaches to a power cord, and wherein said mobile communications device rests in said holder in a horizontal orientation and such that said first side wall extends below said power port;

wherein said first edge which extends a distance $d_1$ from said bottom wall, wherein said second edge which extends a distance $d_2$ from said bottom wall, wherein said front wall extends a distance $d_c$ from said bottom wall as measured along a central axis which is perpendicular to said bottom wall and parallel to said front wall and which intersects the midpoint of said seam, and wherein $d_1 \leq d_c < d_2$, wherein $d_1 > 0$, and wherein $2d_1 < d_2$.

20. The method of claim 19, wherein said front wall does not have a mirror plane of symmetry which is perpendicular to said front wall and which contains said first axis.

\* \* \* \* \*